(12) United States Patent
Hobisch et al.

(10) Patent No.: US 9,469,775 B2
(45) Date of Patent: Oct. 18, 2016

(54) PASTE RESIN FOR UNIVERSAL PIGMENT PASTE

(71) Applicant: Allnex Austria GmbH, Werndorf (AT)

(72) Inventors: Gerald Hobisch, Graz (AT); Peter Morre, Graz (AT); Thomas Schönbacher, Kalsdorf (AT); Edmund Urbano, Graz (AT)

(73) Assignee: Allnex Austria GmbH, Werndorf (AT)

( * ) Notice: Subject to any disclaimer, the term of this patent is extended or adjusted under 35 U.S.C. 154(b) by 57 days.

(21) Appl. No.: 14/134,695

(22) Filed: Dec. 19, 2013

(65) Prior Publication Data

US 2014/0107277 A1    Apr. 17, 2014

Related U.S. Application Data

(63) Continuation of application No. 12/936,621, filed as application No. PCT/EP2009/054481 on Apr. 15, 2009, now abandoned.

(30) Foreign Application Priority Data

Apr. 16, 2008  (EP) .................................. 08007450

(51) Int. Cl.
| C09D 17/00 | (2006.01) |
| C08G 18/28 | (2006.01) |
| C08G 18/67 | (2006.01) |
| C08L 33/08 | (2006.01) |
| C08L 33/14 | (2006.01) |
| C08L 67/08 | (2006.01) |
| C09D 133/14 | (2006.01) |
| C09D 167/08 | (2006.01) |

(52) U.S. Cl.
CPC ............. *C09D 17/00* (2013.01); *C08G 18/283* (2013.01); *C08G 18/672* (2013.01); *C08L 33/08* (2013.01); *C08L 33/14* (2013.01); *C08L 67/08* (2013.01); *C09D 133/14* (2013.01); *C09D 167/08* (2013.01)

(58) Field of Classification Search
CPC ................................. C08L 33/08; C08L 33/14
USPC ........................................................ 524/513
See application file for complete search history.

(56) References Cited

U.S. PATENT DOCUMENTS

| 3,878,140 A | 4/1975 | Sheppard | |
| 4,020,216 A * | 4/1977 | Miller ................ | C08G 18/6283 |
| | | | 428/423.7 |
| 2005/0096407 A1 | 5/2005 | Tomko et al. | |
| 2007/0167603 A1 * | 7/2007 | Urbano .................. | C08G 63/48 |
| | | | 528/272 |
| 2008/0275165 A1 * | 11/2008 | Balk ........................ | C09D 5/02 |
| | | | 523/501 |

FOREIGN PATENT DOCUMENTS

| EP | 0311209 A1 | 4/1989 |
| EP | 0458479 A2 | 11/1991 |
| WO | WO-91/06607 A1 | 5/1991 |
| WO | WO-99/49963 A1 | 10/1999 |

OTHER PUBLICATIONS

WorleeSol Product Information. Obtained Jun. 6, 2013 at http://www.tryline.com/products/docs/WorleeProdBroschUSA_V3%20k2.pdf.*
International Preliminary Report on Patentability for PCT/EP2009/054481 dated Oct. 19, 2010.

* cited by examiner

*Primary Examiner* — Ling Choi
*Assistant Examiner* — Lanee Reuther
(74) *Attorney, Agent, or Firm* — Drinker Biddle & Reath LLP

(57) ABSTRACT

The invention relates to a paste resin AB which is a mixture of a water-reducible alkyd resins B and a basic acrylic copolymer resin A comprising at least one amino group-containing vinyl type monomer A1, and a method of use thereof formulating both water-borne and solvent-borne tinted paints with a wide variety of pigments.

18 Claims, No Drawings

PASTE RESIN FOR UNIVERSAL PIGMENT PASTE

RELATED APPLICATIONS

This Application is a Continuation of application Ser. No. 12/936,621 filed on Oct. 21, 2010, which is incorporated herein by reference in its entirety, Application PCT/EP2009/054481 claims priority for Application 08007450.3 filed on Apr. 16, 2008 in European Patent Office.

FIELD OF THE INVENTION

The present invention relates to a paste resin for a universal pigment paste for tinting of coloured paints.

BACKGROUND OF THE INVENTION

In the paint industry, stock control and logistics are rationalised by using colour mixing systems. In such systems, a paint colour selected for a customer is produced by selecting a base paint from a range of available base paints and adding to the selected base paint one or more pigment pastes which are intimate mixtures of one or more pigments with paste resins which latter having good dispersing properties. Such systems have been widely used in the field of decorative coatings, as disclosed, e.g., in EP 0 311 209 A1.

Examples of pigment pastes for paint tinting systems are disclosed in WO 91/06607 A1 (water-borne polyesters), WO 99/49963 A1 (solvent-borne polyesters), and EP 0 458 479 A2 (acrylic modified polyesters for solvent-borne paints). In addition to at least one pigment, pigment pastes typically include special resins, solvents, and usually also additives. Pigments for various colours vary considerably in chemical nature, from simple inorganic elements such as carbon in the form of channel black or lamp black, to inorganic oxides (such as iron oxides, copper, cobalt, chromium and lead based pigments) and organic pigments (such as azo pigments, phthalocyanine pigments, and polycyclic aromatic pigments such as perylene, anthraquinone and quinacridone pigments). For each pigment, a compatible resin needs to be used. This resin needs, in turn, to be compatible with the binder system of the base paints and with the resins used in other pigment pastes as well, since for most colours, the addition of more than one pigment paste is required. The resin should also be able to disperse a sufficient amount of the pigment. Up to now it has not been possible to use tinting systems compatible with both solvent borne paints and water borne paints, and which are also compatible with the usual range of binder resins.

SUMMARY OF THE INVENTION

The object of the invention is therefore to provide a pigment paste comprising a resin ("paste resin") which is compatible with most types of pigments, as well as most binder resins, be they solvent-borne or water-borne. The paste resin should have sufficient dispersing and wetting power to disperse various pigments based on different raw materials such as those mentioned supra.

This object has been achieved by providing a paste resin which is a mixture of a water-reducible alkyd resin B and a basic acrylic copolymer resin A, wherein the basic acrylic copolymer resin A is a copolymer of at least three classes of vinylic monomers having each at least one copolymerisable olefinic unsaturation, the vinylic monomers comprising at least one amino group-containing vinyl type monomer A1, at least one monomer A2 selected from the group consisting of linear or branched alkyl(meth)acrylates having from 1 to 13 carbon atoms in the alkyl group, and at least one hydrophilic vinyl monomer A3 having a moiety derived from a polyether glycol which is a polyethylene glycol or a mixed ether of ethylene and propylene glycol having a mass fraction of at least 60% of oxyethylene groups in the total mass of oxyalkylene groups, where one of the hydroxyl groups of the polyetherglycol is converted to an ether group, and the other hydroxyl group is consumed by esterification with an olefinically unsaturated mono carboxylic acid, or by etherification with an olefinically unsaturated alcohol, or by urethane formation via reaction with an adduct of a hydroxyalkyl(meth)acrylate and a diisocyanate.

DETAILED DESCRIPTION OF THE PREFERRED EMBODIMENTS

The water-reducible alkyd resin B preferably has an acid number of from 0.2 mg/g to 5 mg/g, particularly preferred from 0.5 mg/g to 3 mg/g, and preferably a dynamic viscosity, measured in a 50% strength dispersion in water at a temperature of 23° C., and a shear stress of 25 s$^{-1}$, according to DIN EN ISO 3219, of from 5 mPa·s to 25 mPa·s.

The alkyd resin B is based on a condensation product of an alkyd resin Ba and an adduct Bb of a $C_1$- to $C_4$-monoalkyl ether Bb1 of a polyoxyethylene glycol or of a $C_1$- to $C_4$-monoalkyl ether Bb2 of a mixed ether of ethylene and propylene glycol, or mixtures thereof, and an anhydride Bb3 of a cycloaliphatic dicarboxylic acid, the ratio of the sum of the amounts of substance of Bb1 and Bb2 to the amount of substance of Bb3 preferably being from 0.95 mol:1.05 mol to 1.05 mol:0.95 mol.

The water-reducible alkyd resin B is preferably made by reaction of Ba and Bb under esterification conditions, i.e. under removal of water preferably in the presence of an entraining agent such as xylene via azeotropic distillation and recycling of the entraining agent. It is also possible to use usual esterification catalysts. Esterification at a temperature of preferably from 170° C. to 260° C. is continued until a sample drawn has an acid number of 3 mg/g or below.

A coating composition is disclosed in U.S. Pat. No. 3,878,140 comprising a mixture of (A) a blend of an acrylic copolymer (A1) made from methyl methacrylate and an alkyl acrylate or an alkyl methacrylate having each from 2 to 12 carbon atoms in the alkyl group, an second acrylic copolymer (A2) made from methyl methacrylate and an adhesion promoting monomer such as 3-(2-methacryl-oxyethyl)-2,2-spiro-cyclohexyl oxazolidine, and a plasticiser (A3) which is either a phthalate ester or an alkyd resin, and a pigmented acrylic composition (B) comprising a copolymer (B1) which is polymethyl methacrylate or a copolymer of methyl methacrylate or a mixture of these polymers, and cellulose acetobutyrate (B2) and an organic plasticiser (B3). The alkyd resin plasticiser disclosed herein is a reaction product of nondrying oil fatty acids, a polyhydric alcohol, and a dicarboxylic acid or its anhydride.

An antifouling agent has been known from US published patent application 2005/0 096 407 A1 which is a combination of a biocidally active material and a nonaqueous dispersion of a polymer binder which latter comprises at least one alkyd resin having a mass fraction of non-volatile matter of at least 90%, a z-average molar mass of between 10 kg/mol and 250 kg/mol as dispersing medium for polymerisation of an acrylic resin, with a mass ratio of alkyd to acrylic portion of from 50:50 to 30:70. The alkyd resin employed may be a long oil or medium oil alkyd based on soya or linseed fatty acid, as also exemplified in Ex. 1A (soybean oil, trimellithic anhydride, and trimethylol ethane) and 1B (soya oil fatty acid, pentaerythritol, crotonic and isophthalic acids).

The acid number is defined as usual according to DIN EN ISO 3682 as the ratio of that mass m(KOH) of potassium hydroxide which is needed to neutralise a sample having a mass m(Sample) to the said mass m(Sample), in the case of a solution or dispersion as a sample, m(Sample) is replaced by the mass m(solids) of solid matter in the said solution or dispersion, the usual unit being "mg/g".

The alkyd resin Ba is made in the usual way, by co-condensation of one or more polyols Ba1 having two or more hydroxyl groups per molecule, one or more polybasic acids (which have two or more acidic groups per molecule) Ba2, and one or more fatty acids Ba3 which may be replaced, or mixed with, one or more triglyceride oils Ba4. Optionally, the condensation mixture may also contain one or more monobasic acids Ba5. Preferably at least one of the fatty acids Ba3 has at least one olefinic unsaturation per molecule. Preferably, at least one of the triglyceride oils Ba4 comprises at least one residue derived from a fatty acid having at least one olefinic unsaturation in its molecule.

The polyols Ba1 are aliphatic linear or branched-chain hydroxyl compounds having from two to six hydroxyl groups per molecule, preferably up to four hydroxyl groups per molecule, such as ethylene glycol, 1,2- and 1,3-propylene glycol, 1,2- and 1,4-butanediol, glycerol, trimethylol propane, trimethylol ethane, erythritol, threitol, pentaerythritol, ditrimethylol propane, ditrimethylol ethane, sorbitol, and mannitol.

The polybasic acids Ba2 may be aliphatic linear, branched or cyclic, or aromatic, having from two to four acid groups, and preferably from 3 to 20 carbon atoms, and may preferably be selected from the group consisting of phthalic acid, trimellithic acid, tetrahydrophthalic acid, adipic acid, malonic acid, cyclohexane dicarboxylic acids, isophthalic and terephthalic acids, and benzophenone tetracarboxylic acid.

The fatty acids Ba3 are preferably at least monoolefinically unsaturated aliphatic monocarboxylic acids having preferably from 4 to 24 carbon atoms. Preferred are lauroleic, myristoleic, palmitoleic, oleic, gadolic, erucic, ricinoleic, linoleic, and linolenic acids, as well as mixtures of these, particularly the naturally occurring mixtures such as soy bean oil fatty acid, linseed oil fatty acid, sunflower oil fatty acid, safflower oil fatty acid, rubber seed oil fatty acid, and tall oil fatty acid.

The triglyceride oils Ba4 are oils preferably having an iodine number of from 120 cg/g to 200 cg/g, particularly preferably soy bean oil, linseed oil, sunflower oil, safflower oil, rubber seed oil, and tall oil.

The monobasic acids Ba5 are preferably aromatic monocarboxylic acids such as benzoic acid or alkyl-substituted benzoic acids, cycloaliphatic monocarboxylic acids, in particular the so-called resin acids, aliphatic branched carboxylic acids, such as isononanoic acid, 2-ethylhexanoic acid, or ®Versatic acid, a mixture of alpha-branched decanoic acids.

Preferably, the alkyd resins Ba have an acid number of less than 5 mg/g, particularly preferred from 0.1 mg/g to 4 mg/g, and especially preferred from 0.2 mg/g to 3.5 mg/g. Their hydroxyl number is preferably from 30 mg/g to 100 mg/g, particularly preferred from 40 mg/g to 90 mg/g, and especially preferred from 60 mg/g to 85 mg/g.

The adduct Bb is the reaction product of a hydroxyl group-containing monoalkyl ether Bb1 selected from the group consisting of $C_1$- to $C_4$-monoalkyl ethers Bb11 of a polyoxyethylene glycol, a $C_1$- to $C_4$-monoalkyl ether Bb12 of a mixed ether of ethylene and propylene glycol, and of mixtures thereof, and an anhydride Bb2 of a cycloaliphatic dicarboxylic acid, the ratio of the sum of the amounts of substance of Bb11 and Bb12 to the amount of substance of Bb2 preferably being from 0.95 mol:1.05 mol to 1.05 mol:0.95 mol. The adduct Bb preferably has an acid number of from 5 mg/g to 60 mg/g, particularly preferred of from 10 mg/g to 45 mg/g, and especially preferred, of from 15 mg/g to 40 mg/g.

The hydroxy functional ethers Bb11 are preferably methyl, ethyl, n-propyl and n-butyl monoethers of polyethylene glycol, wherein the polyethylene glycol has a weight average molar mass of preferably from 500 g/mol to 4000 g/mol, particularly preferred from 750 g/mol to 3000 g/mol. The average number of hydroxyl groups per molecule is preferably from 0.8 to 1.2, particularly preferred from 0.9 to 1.1. Especially preferred are polyethylene glycols partially etherified with ethanol, and having a molar mass of from 1000 g/mol to 2000 g/mol.

The hydroxy functional ethers Bb12 are preferably methyl, ethyl, n-propyl and n-butyl monoethers of a mixed ether of ethylene and 1,2-propylene glycols, wherein the mass fraction of oxyethylene groups is from 10% to 85%, and the mass fraction of oxy propylene groups is from 90% to 15%, calculated as the ratio of the mass of oxyalkylene groups having two or three carbon atoms, respectively, and the sum of the masses of all oxyalkylene groups in the mixed ether Bb12, and have a weight average molar mass of preferably from 500 g/mol to 10 000 g/mol, particularly preferred from 1000 g/mol to 8000 g/mol. The average number of hydroxyl groups per molecule is preferably from 0.8 to 1.2, particularly preferred from 0.9 to 1.1.

The anhydride Bb2 of a cycloaliphatic dicarboxylic acid can preferably have from 8 to 12 carbon atoms and is preferably selected from the group consisting of tetrahydrophthalic anhydride, hexahydrophthalic anhydride, and their homologues such as methyltetrahydro-phthalic anhydride or butyl tetrahydrophthalic anhydride. It has been found, surprisingly, that cyclic anhydrides of non-cyclic dicarboxylic acids such as maleic or succinic anhydride do not work well in the context of the present invention as they impair the pigment compatibility.

The basic acrylic copolymer resin A is a copolymer of at least three classes of vinylic monomers having each at least one copolymerisable olefinic unsaturation. It comprises at least one amino group-containing vinyl type monomer A1 which preferably has at least one amino group which is particularly preferably a tertiary amino group. Particularly useful amino-functional vinyl monomers are esters of tertiary aminoalcohols with acrylic or methacrylic acid, such as dimethyl aminoethyl (meth)acrylate, dimethyl aminopropyl (meth)acrylate, and amides of monotertiary monoprimary diamines such as dimethylaminoethyl (meth)acrylamide, 3-N,N-dimethylaminopropyl (meth)acrylamide, and the corresponding diethylamino compounds. Further monomers A2 are linear or branched alkyl(meth)acrylates having from 1 to 13 carbon atoms in the alkyl group, such methyl (meth)acrylate, ethyl (meth)acrylate, n-butyl (meth)acrylate, isobutyl (meth)acrylate and 2-ethylhexyl (meth)acrylate. Further monomers present in the polymerisation reaction leading to A are hydrophilic vinyl monomers A3 having a moiety derived from polyethylene glycol or a mixed ether of ethylene and propylene glycol having a mass fraction of at least 60% of oxyethylene groups in the total mass of oxyalkylene groups, the polyether fragment having a molar mass of preferably from 200 g/mol to 5000 g/mol, particularly preferably from 500 g/mol to 1500 g/mol, where one of the hydroxyl groups of the polyetherglycol is converted to an ether group, preferably a methyl, ethyl or butyl ether group, and the other hydroxyl group is consumed by esterification with (meth)acrylic acid or other olefinically unsaturated monocarboxylic acids, or by etherification with an olefinically unsaturated alcohol such as allyl or methallyl alcohols, or by urethane formation via reaction with an adduct of a hydroxyalkyl(meth)acrylate and a diisocyanate. It is particularly preferred to use monomers A3 which are adducts of hydroxyethyl (meth)acrylate, an aromatic isocyanate such as toluoylene diisocyanate or bis(4-isocyanatophenyl)methane, and a polyethylene glycol of a molar mass from 200 g/mol to 5000 g/mol, esters of the said polyethylene glycol with (meth)acrylic acid, and ethers of the said polyethylene glycol with (meth)allyl alcohol. Mixtures of two or more monomers A3 can also be used. The mass fraction of the monomers A1, A2 and A3 are preferably from 15% to 40%, from 15% to 45%, and from 30% to 60%, respectively, particularly preferably from 20% to 35%, from 20% to 40%, and from 35% to 55%, respectively, and especially preferably from 25% to 30%, from 25% to 35%, and from 40% to 50%, respectively. Polymerisation is conducted as customary in solution, using alcohols such as isopropanol, or esters such as butyl acetate as solvents, and azo or peroxo catalysts such as azobis-isobutyronitrile, tert.-amyl peroctoate or tert.-amyl peroxide.

It is also possible to copolymerise with the monomers A1 to A3 any further monomers A4 which are also of the vinyl type, i.e. they also have at least one copolymerisable olefinically unsaturated group in their molecules. These monomers A4 may also be used in mixtures of two or more of these monomers A4. Such monomers are preferably styrene, any of the isomers of alkyl styrenes, particularly methyl styrenes ("vinyl toluene"), vinyl naphthalene, alkyl esters of olefinically unsaturated carboxylic acids, dialkyl esters of olefinically unsaturated dicarboxylic acids, hydroxyalkyl esters of the same acids, unsaturated amides and nitriles derived from such acids, alkyl vinyl ethers, and alkyl vinyl ketones. Acidic vinyl type monomers, such as acrylic or methacrylic acids, are, of course, less preferred.

The constituents A and B are mixed in a mass ratio of from 45% to 75% of A and from 55% to 25% of B, preferably from 50% to 70% of A and from 50% to 30% of B, particularly preferably from 55% to 65% of A and from 45% to 35% of B.

Pigments include inorganic as well as organic pigments. Examples of inorganic pigments include titanium dioxide, zinc oxide, carbon black, iron oxides, bismuth vanadates, raw and burnt sienna or umber, chromium oxide green, cadmium pigments, chromium pigments, etc. Examples of organic pigments include phthalocyanines, quinacridones, quino-phthalones, anthraquinones, isoindolines, pyranthrones, indanthrones, derivatives of dioxazine, diketopyrrolopyrroles, azo-compounds, etc. Optionally, filler pigments may be added, such as clay, silica, talc, mica, wollastonite, wood flour, and the like.

Pigment paste may be produced from the paste resin AB and at least one pigment selected from the group consisting of inorganic pigments and organic pigments. This is preferably done by mixing the paste resin AB with at least one pigment, homogenising the mixture under shear to form a pigment paste, and mixing the said pigment paste with an unpigmented or white pigmented paint comprising an organic paint binder. The organic paint binder is preferably selected from the group consisting of alkyd resins, acrylic resin, acrylic modified alkyd resins, urethane alkyds, and urethane modified acrylic resins. However, also other paint binders such as polyurethane resins can be used, alone, or in mixture with one or more of those mentioned supra. The pigment paste thus produced can be used in combination with a water-borne paint or with a solvent-borne paint, and offers in all combinations coloured or tinted paints with high gloss and good colour strength.

High pigment contents can be realised in the pigment pastes according to the present invention without the use of high amounts of solvent. If organic pigments are used, the pigment content suitably ranges in mass fractions of from 5% to 45%, preferably from 25% to 40%. If inorganic pigments are used, the pigment content should preferably be more than a mass fraction of 10% by weight or, more preferably, even more than 60%. If translucent pigments, e.g. translucent iron oxides, are used, the pigment content can be over a mass fraction of 5%, preferably over 20%, or even 30% or more.

If so desired, the pigment pastes according to the invention may also comprise anti-foaming agents, matting agents, anti-settling agents, anti-skinning agents, such as methyl ethyl ketoxime, and/or other suitable additives.

The invention is also directed to a method for tinting a paint by selecting a base paint from a set of base paints and subsequently mixing the base paint with one or more of the above-described pigment pastes. Although in theory it is possible to mix all colours using a single clear base paint, generally also white base paints are used in tinting systems to obtain colours with sufficient hiding power.

Different grades of white pigmented base paints may be used, if so desired.

Generally, also a limited number of pre-tinted base paints are used to enhance the scope of the miscible colours with sufficient hiding power. Separate base paints for high-gloss, or satin gloss paints may also be used, if so desired.

Pigment pastes according to the present invention are particularly useful because they can be used with a wide variety of paint binder resins, such as water-borne air drying alkyd resins, acrylic resins, and polyurethane resins, as well as solvent borne alkyd resins or acrylic resins. They lead to paints with good gloss and excellent pigment dispersion as well as colour stability.

The following examples are meant to further illustrate the invention without intending to limit to those features disclosed in the examples.

In the examples, all amounts of contents with the unit "%" are mass fractions unless indicated otherwise.

Viscosity was measured at 23° C. at a shear rate of 100 $s^{-1}$, in accordance with ISO 3219. Mass fraction of solids ("non-volatile content") was calculated in accordance with ISO 3251. Oil content is the mass fraction of oil(s) in the mass of the alkyd resin, with the customary unit "%".

EXAMPLES

Example 1

Preparation of an Alkyd Resin B

An adduct was prepared by reacting 929 g of a monomethoxy polyethylene glycol having a molar mass of 2000 g/mol with 71 g of tetrahydrophthalic anhydride in the presence of 1 g of triethylamine as catalyst to 150° C. until a constant acid number of 26.5 mg/g was reached.

After cooling, 644 g of this adduct were mixed with 409 g of an alkyd resin having a hydroxyl number of 70 mg/g and an acid number of less than 3 mg/g made from 160 g of sunflower oil, 72 g of benzoic acid as chain stopper, 100 g of phthalic anhydride and 100 g of pentaerythritol. Xylene was added thereto in the amount of 10% of the mass of the resin mixture, the resulting mixture was heated to 220° C., and water was completely separated, whereafter the xylene was distilled off. The remaining product has an acid number of less than 2.5 mg/g. The dynamic viscosity of the resin was 9.5 Pa·s, measured on a 50% strength aqueous solution. This viscosity did not change during storage at 40° C. during two weeks.

Example 2

Preparation of an Acrylic Copolymer A

A mixture of 270 g of dimethylaminoethyl methacrylate, 50 g of butylacrylate and 230 g of 2-ethylhexyl acrylate and 450 g of an adduct prepared by reacting 1 mol each of hydroxyethyl methacrylate, toluoylene diisocyanate and dried polyethylene glycol monomethyl ether of a molar mass of 750 g/mol were added, simultaneously with 20 g tert.-amylperoctoate dissolved in 200 g of isopropanol over a period of 5 hours to 330 g of isopropanol at reflux condition and stirring under a nitrogen blanket. The mixture was stirred for 1 hour after the addition was complete, and then, further 20 g of catalyst solution were added. When the reaction had ceased and the residual monomer concentration was below 0.3%, the solvent was removed by distillation at approximately 110° C. under reduced pressure. The reaction vessel was then flushed with nitrogen, and the reaction mass was allowed to cool to ambient temperature.

Example 3

Preparation of a Paste Resin 600 g of the alkyd resin of Example 1 and 400 g of the acrylic resin of Example 2 were mixed after charging both resins into a resin kettle and stirring at 80° C. for 1 hour until a homogeneous mixture was obtained. The heating was the switched off, while stirring was continued, and 1222 g of water were then added over a period of 30 minutes whereafter the kettle was allowed to cool to ambient temperature. A semi-viscous, clear solution of the grinding resin having a mass fraction of solids of about 45% was obtained.

Example 4

Formulation of White Basic Paints 4.1 Solvent-Borne White Alkyd Paint
303 g of a solvent-borne alkyd resin (®Vialkyd AS 6172/55 SD60, Cytec Surface Specialties Austria GmbH, an alkyd resin based on soy bean oil having an oil content of 57%, dissolved in ®Shellsol D60, a mixture of $C_{10}$- to $C_{12}$-paraffins and -naphthenes, having a low mass fraction— less than 0.1%—of aromatics), further 67 g of ®Shellsol D60, and 268 g of a white titanium dioxide pigment (®Kronos 2190, Kronos Titan GmbH) were mixed and ground on a bead mill at room temperature for 30 minutes, and then let down with a mixture of a further 303 g of ®Vialkyd AS 6172/55 SD60, 6.7 g of an antiskinning agent (®Additol XL 297/100, based on an oxime, Cytec Surface Specialties Austria GmbH), a siccative mixture of 16.8 g of each of ®Octa-Soligen Cobalt 1, ®Octa-Soligen Calcium 2 and ®Octa-Soligen Zirconium 6 (metal octoate driers, Borchers GmbH, the number indicates the mass fraction in % of metal octoate in the solution, using as solvent ®Shellsol D60), and 1.9 g of a flow and levelling additive (®Additol VXL 4930, based on a polyether modified silicone, Cytec Surface Specialties Austria GmbH). The resulting white paint (approximately 1000 g) had a viscosity measured as described supra of 542 mPa·s.

4.2 Water-Borne White Alkyd Paint
395 g of a water-borne alkyd resin (®Resydrol AY 586w/38WA, an acrylic modified alkyd resin, Cytec Surface Specialties Austria GmbH), and 254 g of a white titanium dioxide pigment (®Kronos 2059, hydrophilically treated, Kronos Titan GmbH), 21.5 g of a combination siccative (®Additol VXW 4940, an emulsion of siccatives based on Co, Ba, and Zr compounds, diluted by to 50% strength with deionised water, Cytec Surface Specialties Austria GmbH), 1.45 g of a defoamer (based on liquid hydrocarbons, ®Additol VXW 6211, Cytec Surface Specialties Austria GmbH) and 5.35 g of a flow and levelling additive (®Additol XW 329, based on a polyether modified silicone, Cytec Surface Specialties Austria GmbH) were mixed and ground on a bead mill at room temperature for 30 minutes, and then let down with a mixture of a further 268 g of ®Resydrol AY 586w/38WA, 5.35 g of ®Additol XL 297 (v. s.), 24.4 g of deionised water, and 7.3 g of an 25% strength aqueous ammonia solution. The resulting white paint (approximately 1000 g) had a viscosity measured as described supra of 949 mPa·s and a pH of from 8.5 to 9.0, determined on a 10% strength dispersion in water.

Example 5

Preparation of Pigment Pastes

Coloured pigment pastes were prepared from the paste resin according to the invention of Example 3 as follows (masses of the constituents in g):

TABLE 1

Pigment Pastes according to the invention

| | Pigment Paste | | | |
|---|---|---|---|---|
| | 5.1 | 5.2 | 5.3 | 5.4 |
| resin of Example 3 | 40.30 | 40.30 | 40.30 | 35.40 |
| deionised water | 22.50 | 22.50 | 22.50 | 22.40 |
| additive (1) | 0.20 | 0.20 | 0.20 | 1.20 |
| additive (2) | 2.00 | 2.00 | 2.00 | 2.00 |
| pigment | 35.00 | 35.00 | 35.00 | 40.00 |
| pigment colour | Yellow (3) | Red (4) | Violet (5) | Green (6) |

(1) preservative additive based on isothiazolinone (®Additol VXW 6372, Cytec Surface Specialties Austria GmbH)
(2) defoamer additive based on liquid hydrocarbons (®Additol VXW 6211, Cytec Surface Specialties Austria GmbH)
(3) ®Hostaperm yellow H3G (Pigment Yellow 154)
(4) ®Hostaperm red E3B (Pigment Violet 19)
(5) ®Hostaperm violet RL spec (Pigment Violet 23)
(6) ®Hostaperm Green GG01

Example 6

Application Results of Tinted Paints

Commercial water-borne pigment pastes (®Colanyl, Clariant International Ltd.) and solvent borne pigment pastes (®Hostatint, idem) in different colours using the pigments ®Hostaperm yellow H3G (Pigment Yellow 154), ®Hostaperm red E3B (Pigment Violet 19), ®Hostaperm violet RL spec (Pigment Violet 23), and ®Hostaperm Green GG01, were compared to the pigment pastes of Example 5 made from the same pigments as the commercial grades, but with the paste resin of Example 3, by preparing tinted paints from the solvent-borne white alkyd paint of Example 4.1 and the water-borne white alkyd paint of Example 4.2.

The pigment pastes 5.1 through 5.4, and for comparison, the commercial water-borne and solvent-borne pigment pastes were used as tinting pastes to prepare coloured paints based on the white paints of Examples 4.1 and 4.2, according to the following recipes:

TABLE 2

Paint Preparation (Pigment Paste Data and Mass of Pigment Paste in g)

| | Pigment Paste Data | | Mass of Pigment Paste in g for | |
|---|---|---|---|---|
| Paint No. | Viscosity* in mPa · s | Mass Fraction of Pigment in % | (−1) of Example 4.1 | (−2) of Example 4.2 |
| 6.1- | 868 | 35 | 5.0 | 5.0 |
| 6.2C- | 706 | 33 | 5.3 | 5.3 |
| 6.3H- | 1700 | 33 | 5.0 | 5.0 |
| 6.4- | 439 | 35 | 5.0 | 5.0 |
| 6.5C- | 580 | 32 | 5.4 | 5.4 |
| 6.6- | 300 | 35 | 5.0 | 5.0 |
| 6.7C- | 502 | 30 | 5.8 | 5.8 |
| 6.8H- | 1000 | 20 | 8.8 | 8.8 |
| 6.9- | 326 | 40 | 5.0 | 5.0 |
| 6.10C- | 340 | 50 | 4.0 | 4.0 |
| 6.11H- | 970 | 45 | 4.4 | 4.4 |

Paints 6.1, 6.4. 6.6 and 6.9 were prepared with the tinting pastes 5.1, 5.2, 5.3 and 5.4, respectively.
Paints 6.2C, 6.5C, 6.7C and 6.10C were prepared with the water-borne pigment pastes ®Colanyl yellow H3G100, ®Colanyl red 3B130, ®Colanyl violet RL131, and ®Colanyl green GG131, respectively, and paints 6.3H, 6.8H, and 6.11H were prepared with the solvent-borne pigment pastes ®Hostatint yellow AH3G100, ®Hostatint violet ARL 100, and ®Hostatint green GG30, respectively.
A "1" or a "2" are suffixed to the paint designations depending on whether the paint had been prepared using 152 g of the solvent-borne (sb) white paint 4.1 or 162 g of the water-borne (wb) white paint 4.2.

Gloss and colour strength were measured on paint films prepared from these paints with an applicator frame (BYK-Gardner PA-2056) in a wet film strength of 150 μm on a glass panel (10 cm×15 cm) and dried for twenty-four hours at room temperature (21° C.). The results are summarised in table 3. Gloss was measured at room temperature (21° C.) and 50% relative humidity, with a BYK micro-trigloss meter, and colour strength was rated with "1" denoting highest tinting power, and "5" denoting low tinting power.

TABLE 3

Results from Paint Tests

| | Paint 6.XX-1 (sb) | | | Paint 6.XX-2 (wb) | | |
|---|---|---|---|---|---|---|
| Paint No. | Gloss 20° | Gloss 60° | Colour strength | Gloss 20° | Gloss 60° | Colour strength |
| 6.1- | 83.8 | 92.0 | 1 | 76.5 | 86.5 | 1 |
| 6.2C- | 80.8 | 90.6 | 5 | 75.6 | 86.5 | 1 |
| 6.3H- | 82.3 | 91.8 | 1 | 53.0 | 77.7 | 5 |
| 6.4- | 83.2 | 90.5 | 1 | 75.1 | 85.1 | 1 |
| 6.5C- | 80.9 | 88.2 | 4-5 | 73.5 | 84.5 | 3 |
| 6.6- | 82.6 | 89.8 | 1 | 71.3 | 84.3 | 2 |
| 6.7C- | 80.1 | 86.9 | 4 | 73.4 | 84.2 | 1 |
| 6.8H- | 82.5 | 89.1 | 3-4 | 62.4 | 80.7 | 5 |
| 6.9- | 83.1 | 90.7 | 2 | 75.9 | 85.2 | 3 |
| 6.10C- | 81.0 | 87.7 | 5 | 76.0 | 85.8 | 3 |
| 6.11H- | 82.1 | 90.4 | 2 | 66.1 | 81.5 | 5 |
| white paint | — | — | — | 76.5 | 86.7 | — |

It can be seen from this table that pigment pastes made with the paste resin according to the invention yield favourable results in combination with a water-borne white paint, comparable to those obtained with a commercial water-borne pigment paste, whereas a commercial solvent-borne pigment paste in combination with the same water-borne paint has less gloss and colour strength.

On the other hand, pigment pastes made with the paste resin according to the invention also yield favourable results in combination with a solvent-borne white paint, comparable to those obtained with a commercial solvent-borne pigment paste, whereas a commercial water-borne pigment paste in combination with the same solvent-borne paint has less gloss and colour strength.

The paste resin according to the invention therefore has exceptionally good compatibility with both solvent-borne and water-borne paints, in both cases performing on par with the same class of commercially available state-of-the-art pigment pastes, with no trade-off for universal compatibility. The same results have been found when pigmented paints were made based on solvent-borne and water-borne acrylic paint binders. It is therefore sufficient for paint formulation to prepare only one tinting paste based on the paste resin according to the invention, for use with water-borne or solvent-borne alkyd paints and also for use with water-borne or solvent-borne acrylic paints, thereby eliminating the need to stock different pigment pastes for each of the named paint binders.

It has also been found that pigment pastes prepared with paste resins according to the invention may be used for hybrid resins based on acrylated alkyd resins, as well as for urethane alkyd and urethane acrylic resins as paint binders, and also in combination with the inorganic and organic pigment materials mentioned earlier.

The important effect of monomers of class A3 in the basic acrylic copolymer resin can best be seen from a comparison where this class of monomers A3 is missing.

Example 7

Pigment Paste from a Comparative Acrylic Copolymer Resin 7.1 Comparative Acrylic Resin A mixture of 250 g of dimethylaminoethyl methacrylate, 650 g of n-butylacrylate, and 100 g of hydroxyethyl acrylate were added, concurrently with a solution of 20 g of azobis-isovaleronitrile in 70 g of methoxypropanol, over a period of eight hours to a glass vessel charged with 160 g of methoxypropanol kept at 85° C., and the contents of the vessel were stirred under a nitrogen blanket. After completion of the addition, the reaction mixture was stirred for two more hours, a further quantity of 1 g of the same radical initiator was added, dissolved in 10 g of methoxypropanol, and the reaction mixture was stirred for two more hours. Further 20 g of methoxypropanol were then added, and the mixture was allowed to cool to room temperature.

7.2 Mixture of Alkyd and Acrylic Resins 129 g of the acrylic resins solution of Example 7.1 were transferred to a glass vessel, the solvent methoxypropanol was removed by distillation at 140° C. under reduced pressure. The vessel was then flushed with nitrogen, and after cooling to below 100° C., 133 g of the alkyd resin of Example 1 were added, and well mixed with the acrylic resin at 80° C. for one hour. The mixture was cooled under stirring by switching off the heating, and by adding 313 g of fully deionised water over a period of thirty minutes. The vessel and its contents were then allowed to cool to ambient temperature. An inhomogeneous resin and water mixture having a mass fraction of solids of about 45% was obtained.

7.3 Preparation of a Pigment Paste

A sample of 30.1 g of the mixture of Example 7.2 was taken immediately after homo-genisation and before phase separation, mixed with 27.7 g of deionised water, 0.2 g of an isothiazolinone-based preservative (®Additol VXW 6372, Cytec Surface Specialties Austria GmbH), 2 g of a defoamer based on liquid hydrocarbons (®Additol VXW 6211, Cytec Surface Specialties Austria GmbH), and 40 g of a red quinacridone pigment (Pigment Violet 19, ®Hostaperm Red E3B, Clariant Deutschland GmbH). The mixture was homogenised on a bead mill at room temperature (21° C.) for thirty minutes.

7.4 Preparation of a Tinted Paint

A tinted paint was made by adding 5 g of the pigment paste of Example 7.3 to 152 g of the solvent-borne white alkyd paint of Example 4.1. Gloss and colour strength were measured on paint films prepared from these paints with an applicator frame (BYK-Gardner PA-2056) in a wet film strength of 150 μm on a glass panel (10 cm×15 cm) and dried for twenty-four hours at room temperature (21° C.). The results are summarised in table 4. Gloss was measured at room temperature (21° C.) and 50% relative humidity, with a BYK micro-trigloss meter, and colour strength was rated with "1" denoting highest tinting power, and "5" denoting low tinting power.

TABLE 4

Results using a Paste Resin made from a Comparative Acrylic Resin

| Paint | Gloss at 20° | Gloss at 60° | Colour Strength |
|---|---|---|---|
| 7.4 | 51 | 79 | 5 |

Similar results were obtained when a water-borne alkyd paint (the white paint of Example 4.2) was used in combination with the pigment paste of Example 7.3.

This comparison shows that gloss and colour strength are markedly improved in tinted paints if a hydrophilically modified basic acrylic resin is used as one component of a paste resin, together with the alkyd resins according to the invention. This beneficial effect is seen both in solvent-borne and in water-borne paints.

The invention claimed is:

1. A paste resin AB which is a mixture of a water-reducible alkyd resin B and a basic acrylic copolymer resin A, wherein the basic acrylic copolymer resin A is a copolymer of at least three classes of vinylic monomers A1, A2, and A3 having each at least one copolymerisable olefinic unsaturation, the vinylic monomers A1, A2, and A3 comprising a mass fraction of monomers A1 from 15% to 40%, a mass fraction of monomers A2 from 15% to 35%, and a mass fraction of monomers A3 from 30% to 60%, comprising at least one amino group-containing vinyl monomer A1 which comprises at least one tertiary amino group, at least one monomer A2 selected from the group consisting of linear or branched alkyl(meth)acrylates having from 1 to 13 carbon atoms in the alkyl group, and at least one hydrophilic vinyl monomer A3 comprising a moiety derived from a polyether glycol which is a polyethylene glycol or a mixed ether of ethylene and propylene glycol having a mass fraction of at least 60% of oxyethylene groups in the total mass of oxyalkylene groups, where one of the hydroxyl groups of the polyetherglycol is converted to an ether group, and the other hydroxyl group is consumed by urethane formation via reaction with an adduct of a hydroxyalkyl (meth)acrylate and a diisocyanate.

2. The paste resin AB of claim 1 wherein the water-reducible alkyd resin B has an acid number of from 0.2 mg/g to 5 mg/g.

3. The paste resin AB of claim 1 wherein the water-reducible alkyd resin B is based on a condensation product of an alkyd resin Ba and an adduct Bb of a C1- to C4-monoalkyl ether Bb1 of a polyoxyethylene glycol or of a C1- to C4-monoalkyl ether Bb2 of a mixed ether of ethylene and propylene glycol, or mixtures thereof, and an anhydride Bb3 of a cycloaliphatic dicarboxylic acid, and wherein in the water-reducible alkyd resin B, the ratio of the sum of the amounts of substance of Bb1 and Bb2 to the amount of substance of Bb3 is from 0.95 mol: 1.05 mol to 1.05 mol: 0.95 mol.

4. The paste resin AB of claim 3 wherein the alkyd resin Ba is made by co-condensation of one or more polyols Ba1 having two or more hydroxyl groups per molecule, one or more polybasic acids Ba2, and one or more fatty acids Ba3 which may be replaced, or mixed with, one or more triglyceride oils Ba4.

5. The paste resin AB of claim 1 wherein the mass fraction of monomers A1 is from 20% to 35%, the mass fraction of monomers A2 is from 20% to 35%, and the mass fraction of monomers A3 is from 35% to 55%.

6. The paste resin AB of claim 1 wherein the monomer A3 is a reaction product of polyethylene glycol monoether, toluene diisocyanate and hydroxyethyl methacrylate.

7. The paste resin AB of claim 1 wherein the constituents A and B are mixed in a mass ratio of from 45% to 75% of A and from 55% to 25% of B.

8. A pigment paste comprising the paste resin AB of claim 1 and at least one pigment selected from the group consisting of inorganic pigments and organic pigments.

9. A method of using a paste resin AB of claim 1;
comprising mixing the paste resin AB with at least one pigment, homogenising the mixture under shear to form a pigment paste, and
mixing the pigment paste with an unpigmented or white pigmented paint comprising an organic paint binder.

10. The method of claim 9 wherein the said paint binder is selected from the group consisting of alkyd resins, acrylic resin, acrylic modified alkyd resins, urethane alkyds, and urethane modified acrylic resins.

11. The method of claim 9 wherein the paint is a water-borne paint.

12. The method of claim 9 wherein the paint is a solvent-borne paint.

13. The method of claim 9, wherein the water-reducible alkyd resin B has an acid number of from 0.2 mg/g to 5 mg/g.

14. The method of claim 9, wherein the water-reducible alkyd resin B is based on a condensation product of an alkyd resin Ba and an adduct Bb of a to C4-monoalkyl ether Bb1 of a pulyuxyethylene glycol or of a C1- to C4-monoalkyl ether Bb2 of a mixed ether of ethylene and propylene glycol, or mixtures thereof, and an anhydride Bb3 of a cyclualiphatic dicarboxylic acid, and wherein in the water-reducible alkyd resin B, the ratio of the sum of the amounts of substance of Bb1 and Bb2 to the amount of substance of Bb3 being from 0.95 mol:1.05 mol to 1.05 mol: 0.95 mol.

15. The method of claim 9 wherein the monomer A3 is a reaction product of polyethylene glycol monoether, toluylene diisocyanate and hydroxyethyl methacrylate.

16. The method of claim 14 wherein the alkyd resin Ba is made by co-condensation of one or more polyols Ba1 having two or more hydroxyl groups per molecule, one or more polybasic acids Ba2, and one or more fatty acids Ba3 which may be replaced, or mixed with, one or more triglyceride oils Ba4.

17. The method of claim 9 wherein the constituents A and B are mixed in a mass ratio of from 45% to 75% of A and from 55% to 25% of B.

18. The method of claim 9, wherein at least one pigment selected from the group consisting of inorganic pigments and organic pigments is admixed to the paste resin AB.

* * * * *